G. FRINK.
CLUTCH OPERATING MECHANISM.
APPLICATION FILED OCT. 30, 1916.
1,249,736.
Patented Dec. 11, 1917.
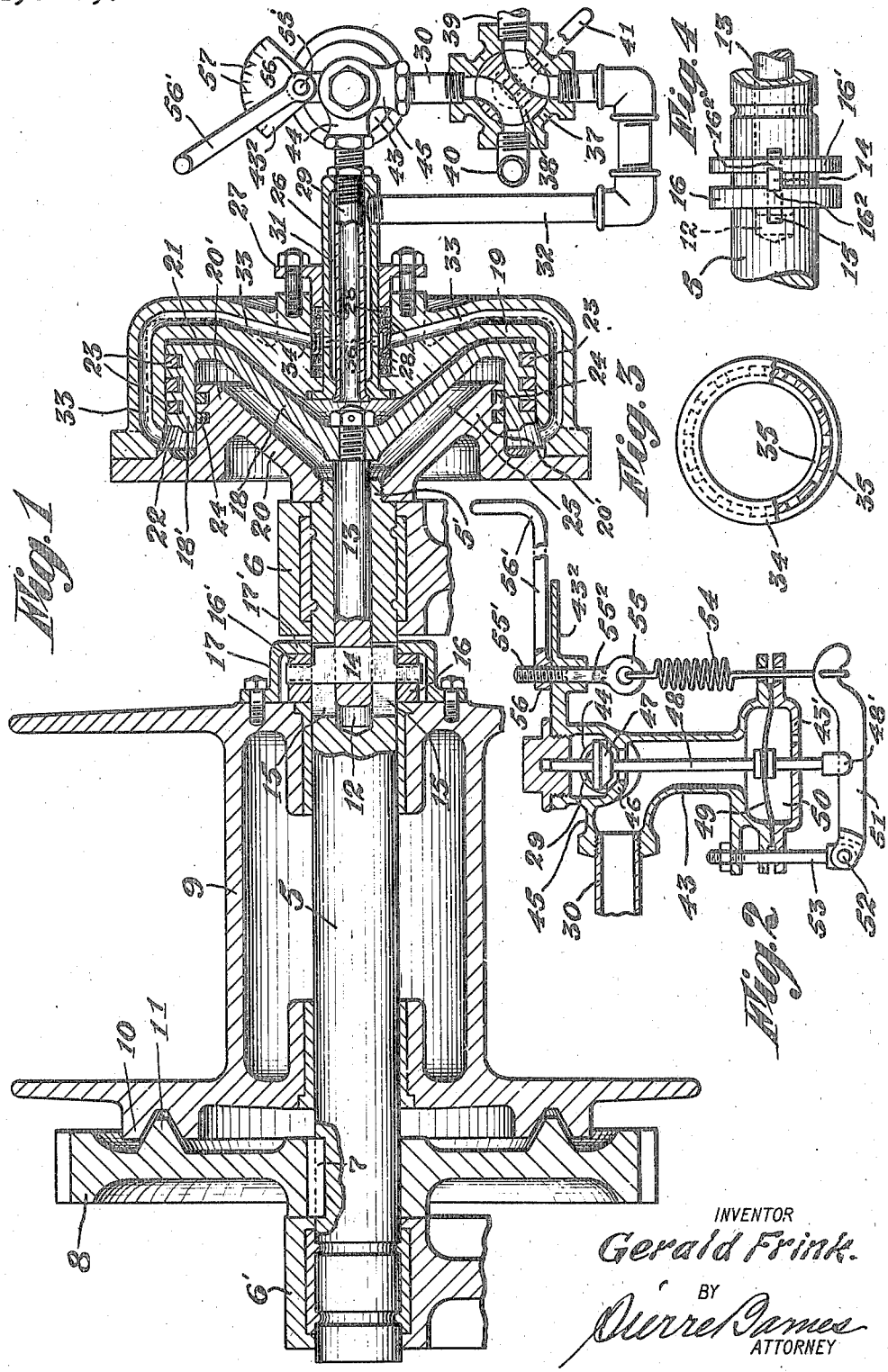
INVENTOR
Gerald Frink.
BY
Pierre James
ATTORNEY

UNITED STATES PATENT OFFICE.

GERALD FRINK, OF SEATTLE, WASHINGTON.

CLUTCH-OPERATING MECHANISM.

1,249,736.

Specification of Letters Patent. Patented Dec. 11, 1917.

Application filed October 30, 1916. Serial No. 128,437.

*To all whom it may concern:*

Be it known that I, GERALD FRINK, a citizen of the United States, residing at Seattle, in the county of King and State of Washington, have invented certain new and useful Improvements in Clutch-Operating Mechanism, of which the following is a specification.

This invention relates to mechanism for operating friction clutches through the agency of fluid under pressure. The principal object of my invention is the provision of improved devices whereby the shiftable clutch element may be actuated by a fluid power medium to positively couple or disengage the same from the other clutch element.

A further object of the invention is to provide means whereby the clutch-operating mechanism may be carried by the drum shaft of a hoisting engine and in proximity to one of the shaft's journal boxes without subjecting the latter to the influence of steam where the same is employed as the power agent.

A still further object of the invention is the provision of means for regulating the pressure of the power agent when employed for actuating the clutch and releasably maintaining it engaged under such pressure as will insure efficient work.

With these and other ends in view, the invention consists in the novel construction, adaptation and combination of parts, as will be hereinafter described and claimed.

In the accompanying drawings, Figure 1 is a horizontal sectional view illustrating an embodiment of my invention applied to parts of a hoisting engine. Fig. 2 is a transverse vertical section of the steam pressure controller shown at the right hand side of Fig. 1. Fig. 3 is a view partly in end elevation and partly in section of the fluid distributer ring employed in the machine. Fig. 4 is a plan view of a portion of the shaft and associated parts.

The reference numeral 5 designates a shaft which is journaled in bearing boxes 6 and $6^1$ provided in a machine frame. Rigidly secured to said shaft, as by means of a key 7, is a spur gear 8 which is driven by a pinion (not shown) to rotate the shaft.

Mounted loosely on said shaft is a drum 9 provided at one end with a clutch element 10 engageable with a clutch element 11 provided on said spur gear when the drum is suitably shifted.

The shaft 5 is provided at one end with an axial bore 12 to accommodate a rod 13 having near its inner end a slot in which is engaged a key 14 of a length sufficient to extend through and protrude outside of a slot 15 extending diametrically through the shaft.

16 designates a collar mounted on the shaft between the drum 9 and the key 14, and $16^1$ is a collar similarly mounted between the key and the flange $17^1$ of member 17 which is rigidly secured to the adjacent end of the drum.

As best shown in Fig. 4, the opposing faces of the collars 16 and $16^1$ are desirably provided with slots $16^2$ to embrace the ends of the key 14 and cause the collars to rotate with the key and shaft.

The outer end of the rod 13 is secured to and serves as the piston-rod for a piston 18 which is operable in a cylinder 19 disposed in axial alinement with the shaft and rigidly connected therewith by having the cylinder head 20 engage a screw-threaded extremity $5^1$ of the shaft.

The cylinder is bored to provide a chamber 21, hereinafter designated as the "setting chamber" at one side of the piston and at the opposite side of the piston an annular chamber 22, hereinafter designated as the "retracting chamber" is afforded between the peripheral wall of the cylinder bore and a portion $20^1$ of the head which extends into the bore of the cylinder, as shown in Fig. 1. The piston 18 is formed at the periphery with a rim $18^1$ which operates in the retracting chamber 22.

Packing rings 23 and 24 are respectively provided in grooves formed in the outer peripheries of the piston and of the head-part $20^1$ and serve to prevent leakage of the power agent between the two chambers and also between the retracting chamber 22 and the space 25 about the piston rod.

26 represents a non-rotatable cylindrical casing extending axially through the outer end of the cylinder and having a stuffing box provided with a gland 27 for retaining packing or gaskets 28 in place.

Extending through the casing is a tube 29 whereby communication is had between the setting chamber 21 and a pipe 30 through which the power agent, as steam, for example, is conducted to and from such setting chamber.

About the tube 29 in said casing is provided an annular cavity 31 which is connected by a pipe 32 whereby the steam is conducted to and from said cavity and thence to the retracting chamber 22 through passages 33 provided in the cylinder walls, as shown.

Between the cavity 31 and said passages, I employ a distributer 34 in the nature of an apertured annulus which is positioned intermediate the packing rings 28. Said distributer is provided with inner and outer peripheral grooves 35 (Fig. 3) to afford connections through casing holes 36 with the cavity 31 in the casing and also with the cylinder passages 33.

37 represents the casing of a four-way valve 38 of the rotary type, said casing being provided with openings to receive the pipes 30 and 32 and also pipes 39 and 40, the pipe 39 being an exhaust pipe leading to the atmosphere and the other pipe, 40, is connected with a source from which the operating fluid is supplied, such as a steam boiler, not shown. The valve 38 is manipulated by means of a lever handle, indicated by 41.

Included in the invention and located between the pipe 30 and the communicating tube 29 is a controller for selectively regulating the pressure of the steam supplied to the setting chamber 21.

Such controller is illustrated in its preferred form in Figs. 1 and 2, and comprises a chambered body 43 having branches 44 and 45 for connecting the same to the tube 29 and the pipe 30. Interiorly of the casing and between such connections is a partition 46 having an opening about which is a seat for a valve 47. The stem 48 of this valve is connected with a flexible diaphragm 49 extending across the compartment 50 of relatively large diameter. The valve stem 48, moreover, extends through the lower end wall $43^1$ of the body and terminates in a bifurcated end $48^1$ which seats upon a lever 51 which is fulcrumed from one end by a pin 52 to a rod 53 depending from the body 43.

The other end of lever 51 engages an end of a helical extensible spring 54 which is suspended from an eye-bolt 55 having a screw-threaded shank $55^1$ which extends through a bracket $43^2$ to engage in a threaded hole provided in the boss 56 of an operating handle $56^1$ positioned above said bracket.

The eye-bolt is secured against turning by making a part of the shank polygonal, as indicated by $55^2$, to fit in a correspondingly-shaped opening in the bracket. To facilitate the adjustments of the spring graduation marks, as 57, (Fig. 1) are desirably provided beneath the handle $56^1$ on the upper surface of the bracket.

By turning the handle in one rotary direction or the other, the effective power of the spring 54 will be increased or diminished with a corresponding capacity to maintain the valve 47 more or less open with respect to its seat, and in opposition to the fluid pressure acting against the diaphragm 49 which tends to close the valve, and, as will be understood, the pressure of the fluid beyond the valve may be lessened below that obtaining in the pipe by suitably regulating the power of the spring through the medium of the handle $56^1$.

In operation, the steam or other fluid under pressure is admitted selectively into either the chamber 21 or the chamber 22 to actuate the piston 18 according to whether the drum is to be set forward to couple the same with the spur-gear through the medium of clutch elements 10 and 11, or the drum is to be retracted from such engagement.

During these actions the drum shifting is accomplished through the agency of the piston rod 13, the key 14 and one or the other of the collars 16 or $16^1$ acting between the drum and the flange $17^1$ of the member 17 which, in effect, is an extension of the drum.

By reason of the difference between the areas of the opposite ends of the piston which are subjected to the action of the fluid in the chambers 21 and 22, it is evident that the power applied for coupling the drum to the spur-gear and maintaining it in such relation is greater than that utilized for separating the same.

Under certain conditions, as in logging operations, it is advantageous to regulate the pressure acting to retain the clutch in engagement so that when an excessive load is encountered the drum will slip, so to speak, with respect to the driving gear.

To attain this result and also relieve the machine from undue strains, the operator adjusts the handle $56^1$ to regulate the effective power of the spring 54 which controls the pressure of the fluid supplied to the setting chamber 21, thereby regulating the power exercised through the piston to impart more or less rapid movements to the drum in clutching the same, and also enabling the operator to regulate the force by which the drum is maintained in engagement with the spur wheel 8.

The advantages of the invention reside principally in the provision of devices whereby a fluid power medium may be efficiently employed for the rapid applying and disengaging of the clutch mechanism; in the means for regulating the action of the fluid pressure according to the duty; and in the novel construction of the cylinder and piston together with the peculiar manner of packing so that steam may be used without injuriously affecting the drum shaft, the journal bearings therefor, or interfering with the work by reason of hot boxes.

What I claim as my invention, is—

1. In apparatus of the class described, the combination with a hollow shaft, and clutch-operating mechanism extending into said shaft, of a cylinder secured to an end of the shaft and having a portion of one of its ends projecting into the cylinder bore, a piston within the cylinder, said piston being provided with a rim extending into the annular space surrounding said projecting portion of the cylinder end, operative connections between the piston and said clutch-operating mechanism, and means to supply a fluid power agent into the aforesaid annular space or into the cylinder space at the opposite side of the piston, selectively.

2. In apparatus of the class described, a shaft, clutch mechanism, a cylinder connected to one end of the shaft, said cylinder being provided with an axially disposed cylindrical portion projecting into the cylinder bore from the cylinder head adjacent to the shaft, a piston operable within the cylinder, said piston being provided with a rim portion which extends into the annular space surrounding the aforesaid cylindrical portion of the head, packing for the inner and outer peripheries of the piston rim, a rod connected to the piston and extending into the shaft, operative connections between the piston rod and said clutch mechanism, and means to supply fluid under pressure into either said annular space or into the cylinder space at the opposite side of the piston to impart movements thereto to effect the disengaging or engaging of said clutch mechanism.

3. In apparatus of the class described, the combination with a shaft and clutch mechanism carried thereby, of a steam cylinder having concentric walls and connected to said shaft, a piston having a rim extending into the annular chamber between said piston walls; a piston rod extending into said shaft and operatively connecting the piston with said clutch mechanism, passages connected with said annular chamber and the chamber at the opposite side of the piston therefrom, a valve provided for said passages and affording communication through a selected one of said passages between a source of steam supply and one of said chambers and also affording communication between the other of said chambers and the atmosphere, and packing provided for one of said chambers whereby the steam admitted therein is prevented from contacting with said piston rod.

4. In apparatus of the class described, a cylinder, provided adjacent to one of its ends with concentric walls; a piston having a peripheral rim operable in the annular space between said walls; a piston-rod, means to supply steam predeterminately to either end of the cylinder, and means to pack the piston and one of said cylinder walls to protect said piston-rod from direct contact with the steam.

Signed at Seattle, Washington, this 16th day of October, 1916.

GERALD FRINK.

Witness:
   E. PETERSON.